United States Patent [19]

Kiema et al.

[11] Patent Number: 5,684,793
[45] Date of Patent: Nov. 4, 1997

[54] BASE STATION RECEIVER EQUIPMENT

[75] Inventors: Arto Kiema, Oulu; Ilkka Keskitalo, Jääli; Petri Jolma; Jari Savusalo, both of Oulu, all of Finland

[73] Assignee: Nokia Telecommunications OY, Espoo, Finland

[21] Appl. No.: 564,197

[22] PCT Filed: Jun. 6, 1994

[86] PCT No.: PCT/FI94/00239

§ 371 Date: Mar. 22, 1996

§ 102(e) Date: Mar. 22, 1996

[87] PCT Pub. No.: WO94/30025

PCT Pub. Date: Dec. 22, 1994

[30] Foreign Application Priority Data

Jun. 7, 1993 [FI] Finland .................. 932605

[51] Int. Cl.⁶ .................. H04B 7/216
[52] U.S. Cl. .......... 370/335; 370/342; 370/360; 375/347; 455/135; 455/137; 455/138; 455/273
[58] Field of Search .................. 370/18, 19, 20, 370/21, 53, 54, 58.1, 58.2, 65.5, 252, 320, 328, 335, 342, 357, 360, 384, 441, 58.3; 375/205, 267, 200, 206, 207, 208, 209, 210, 347, 369; 455/65, 52.3, 101, 132, 133, 135, 137, 138, 226.1, 226.2, 226.3, 296, 273, 303, 52.1

[56] References Cited

U.S. PATENT DOCUMENTS

| | | |
|---|---|---|
| 4,530,087 | 7/1985 | Yamamoto .................. 375/267 |
| 4,984,247 | 1/1991 | Kaufmann et al. . |
| 5,109,390 | 4/1992 | Gilhousen et al. .................. 370/18 |
| 5,166,952 | 11/1992 | Omurg et al. . |
| 5,237,586 | 8/1993 | Bottomley .................. 375/205 |
| 5,293,398 | 3/1994 | Hamao et al. . |
| 5,305,349 | 4/1994 | Dent .................. 375/205 |

FOREIGN PATENT DOCUMENTS

| | | | |
|---|---|---|---|
| 491 668 | 6/1992 | European Pat. Off. ......... | H04J 13/00 |
| 526 439 | 2/1993 | European Pat. Off. ......... | H04J 13/00 |
| 676 179 | 12/1990 | Switzerland .................. | H04B 7/216 |

OTHER PUBLICATIONS

Cooper, G. et al., *Modern Communications and Spread Spectrum*, Chapter 12: "Detection of Spread-Spectrum Signals", McGraw-Hill, New York, 1986, pp. 345–375.

*Primary Examiner*—Wellington Chin
*Assistant Examiner*—Huy D. Vu
*Attorney, Agent, or Firm*—Cushman Darby & Cushman IP Group of Pillsbury Madison & Sutro LLP

[57] ABSTRACT

A rake-type CDMA base station receiver equipment, including a plurality of correlators each having a received signal as its input, a plurality of diversity combiners for respective receiver branches, and a measurer for measuring the quality of the received signal. To reduce the number of correlators and diversity combiners, the receiver equipment further includes switches for switching the correlators to the different combiners, and controllers for controlling the switches on the basis of data sent from the measurer for measuring the quality of the received signal or on the basis of the capacity loading of the base station receiver equipment.

6 Claims, 2 Drawing Sheets

BASE STATION RECEIVER EQUIPMENT

This application claims benefit of international application PCT/FI94/00239 filed Jun. 6, 1994, published as WO94/30025 Dec. 22, 1994.

BACKGROUND OF THE INVENTION

The invention relates to a rake-type CDMA base station receiver equipment, comprising a number of correlators each having a received signal as its input, a number of diversity combiners, and means for measuring the quality of the received signal.

CDMA is a multiple access method based on the spread spectrum technique, and it has been applied recently in cellular radio systems due to its several advantages, such as spectral efficiency.

In CDMA each signal consists of an individual pseudo-random sequence, which modulates the baseband frequency while spreading the band of the data signal. Data signals of a number of users are transmitted simultaneously on the same frequency band. Users are distinguished from each other by a pseudorandom sequence called a spreading code. Correlators provided in the receivers are synchronized with a desired signal, which they recognize on the basis of the spreading code, and restore the original band of the signal. On arriving at the receiver, signals having another spreading code do not correlate in an ideal case, but retain their wide band and thus appear as noise in the receivers. One aims at selecting the spreading codes used by the system in such a way that they are orthogonal with respect to each other, i.e. do not correlate with each other.

The properties of CDMA differ from those of the traditional TDMA and FDMA multiple access methods in many ways. One major difference lies in the attitude of CDMA towards multipath propagation of a signal over a radio path. In the radio traffic between a mobile station and a base station in a typical cellular network environment, signal components propagate over several paths between a transmitter and a receiver. This multipath propagation is mainly due to reflections of the signal from the surrounding surfaces. In the traditional FDMA and TDMA systems, multipath propagation is a major factor deteriorating the quality of a connection, and therefore methods improving the received signal quality, such as equalizers, have been developed to compensate for it. In CDMA, multipath propagation can be utilized.

A so-called rake receiver is used widely as a receiver solution in CDMA, which receiver comprises one or more rake branches or correlators. Rake branches are independent receiver units, the function of which is to assemble and demodulate one received multipath-propagated signal component. The implementation of a rake branch is described more closely in *Modern Communications and Spread Spectrum*, Chapter 12, G. Cooper, C. McGillem, McGraw-Hill, New York 1986. In addition to rake branches intended for signal reception, the CDMA receiver typically comprises at least one separate searcher branch, the function of which is to search out different signal components of a signal transmitted by a desired spreading code, and detect the phases of the signal components. Each rake branch can be controlled so as to be correlated with a signal component propagated over a different path, whereby each signal component arrives at the receiver with a slightly different delay. The control of the rake branches takes place by indicating a desired spreading code and its phase to the correlator. As the signal components propagate over different paths, they often also fade independently of each other. In a traditional CDMA receiver, signals from a number of correlators are preferably combined, which results in a high-quality signal irrespective of the multipath propagation over the radio path. Accordingly, multipath propagation can be utilized as diversity gain.

Due to the mobile character of a radio telephone, the propagation environment between the base station and the radio telephone varies continuously. The strength and number of multipath-propagated signals vary with the location of the radio telephone. Changes and movements occurring in the environment also affect the propagation of radio waves. If there is visual communication between the transmitter and the receiver, the direct signal has a high strength, and reflected ray-beams are of no greater importance. When the signal-to-noise ratio of a received signal is more than 20 dB, a single correlator is needed at the reception, and the reception of a number of ray-beams does not improve the quality of the connection significantly. If there is no visual communication or it is deficient, several reflected signals varying in strength arrive at the receiver.

A conventional CDMA receiver usually comprises one to five rake branches. At best, it is thus able to simultaneously receive five signal components propagated over different paths. FIG. 1 is a simplified block diagram illustrating a conventional CDMA base station comprising three correlators in each receiver. The figure shows by way of example three base station receivers 11, 12 and 13, to which a signal received by an antenna 10 is passed through radio-frequency sections 17. Each receiver 11, 12, 13 comprises three rake branches or correlators 11a–c, 12a–c, 13a–c, which are connected to diversity combiners 14, 15 and 16, respectively, of the receiver. A typical base station comprises e.g. 30 receivers, i.e. channels. It is thus able to process 30 simultaneous calls. Altogether the base station thus has 90 correlators. Depending on the radio wave propagation conditions, the number of required rake branches varies from one receiver to another. In a typical propagation situation, an average total demand of correlators is smaller than the three correlators per one connection mentioned above. As a consequence, the capacity of the receiver is overdimensioned in normal conditions. On the other hand, it is not rare that all correlators are in use, and even a greater number could be used. The number of correlators in the receiver cannot therefore be permanently reduced without risking the quality of the connection. Some base station receivers may have rake branches out of operation at the same time as some other receivers have all their branches in operation and the signal level is nevertheless unsatisfactory. In the traditional solution, where the number of correlators in the receiver is fixed, it may thus happen that the capacity of an individual receiver is under- or overdimensioned.

SUMMARY OF THE INVENTION

The object of the invention is to provide a base station equipment which avoids the above-mentioned problems associated with the dimensioning of capacity.

This is achieved by a solution according to the invention, which is characterized in that the receiver equipment comprises means for switching the correlators to the combiner of any one of the receiver branches, and means for controlling the switching means on the basis of data sent from the means for measuring the quality of the received signal or on the basis of the capacity loading of the base station receiver equipment.

In the base station equipment according to the invention, all rake branches intended for the reception of signals are positioned in a common pool, from where a base station configurator assigns a required number of correlators to each connection. These correlators are connected to the diversity combiner of the channel, from which a composite signal further passes to a network interface. The base station configurator monitors the signal quality over each connection and, if required, changes the number of rake branches in accordance with the signal quality and the number of detected signal components. As the rake branches are dynamically available to all connections, over- or underdimensioning cannot occur in normal situations. The total number of branches at the base station can thus be reduced close to the average demand, which allows considerable savings to be achieved in the costs of the base station equipment.

If the base station is heavily loaded, all of the rake branches may be in use, even though there would be unused transmission capacity at the network interface. In such a case, it is possible to assign a branch used by connections with several branches and having adequate quality to a new connection. In this way the capacity of the base station according to the invention can be increased at the expense of the quality of a connection.

DESCRIPTION OF THE DRAWINGS

In the following, the invention will be described more fully by way of example with reference to the attached drawings, where.

DETAILED DESCRIPTION

Figure 1:
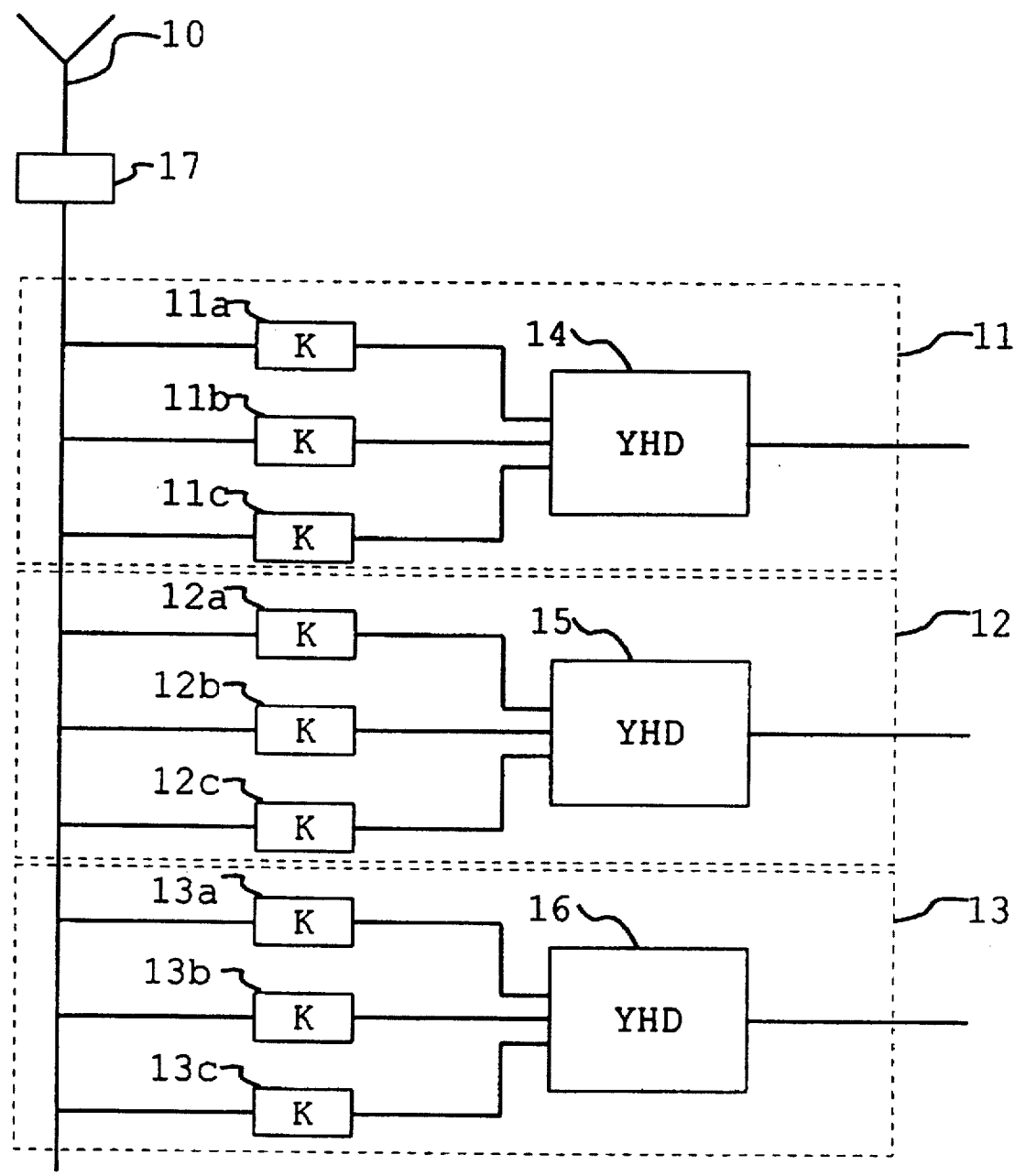
FIG. 1 is a simplified block diagram illustrating a conventional CDMA base station receiver already described above.
Figure 2:
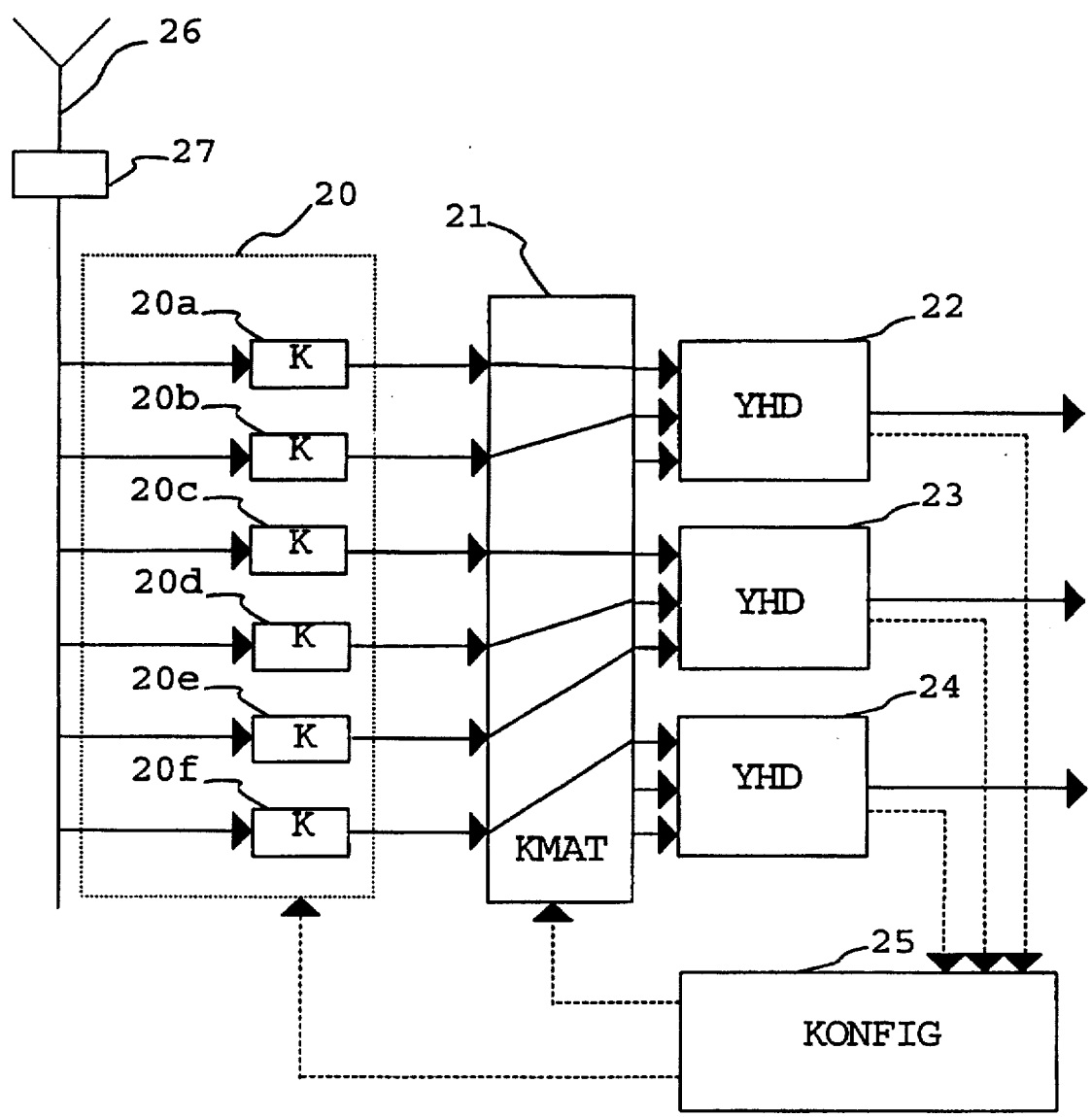
FIG. 2 is a simplified block diagram illustrating a CDMA base station receiver according to the invention.

FIG. 2 shows the principal features of a preferred embodiment of the base station receiver according to the invention. For the sake of clarity, the receiver shown in the figure comprises only six rake correlators 20, a switching matrix 21 for the correlators, three diversity combiners 22, 23, 24, a base station configuration unit 25, an antenna 26, and a radio-frequency section 27. The receiver shown is thus able to receive no more than three channels at a time. The number of correlators and combiners and thus the number of channels is considerably greater in a typical practical base station. A digital signal received by the antenna 26 is applied to the rake correlators 20 of the base station receiver through the radio-frequency sections 27. The base station may employ two or more receiving antennas. The outputs of the correlators 20 are connected to the switching matrix 21, the function of which is to combine the desired correlators 20 to the desired diversity combiners 22, 23, 24. The diversity combiners perform combining of the signal from one or more rake correlators by known methods, such as by maximal ratio combining. In the preferred embodiment of the invention, the measurement of signal quality is also carried out in the combiner 22, 23, 24. The output of each combiner is connected to the network interface, whereto the received and detected signal is forwarded. Prior art combiners already have the required measuring unit, which can be used as such in the invention. Measuring data concerning the quality of a received signal is forwarded to the base station configurator 25, which may be situated physically either in the base station or in a base station controller. The function of the configurator is to analyze the measuring data, typically the signal-to-noise ratio S/N, and assign the correlators to the different connections on the basis of a selected algorithm. This takes place, first, by forwarding the spreading code and phase of the desired signal to the correlators 20, in order that the correlator 20 could be synchronized with the concerned signal, in addition to which the switching matrix 21 is employed to switch the output of the correlator to the input of the desired combiner 22, 23, 24.

The operating procedure of the base station receiver may be e.g. as follows.

The base station is started by default parameters; the setup may consist e.g. of assigning the rake correlators 20a–20f equally to the combiners 22, 23, 24. The base station establishes connections to mobile stations residing within its area by known methods by using signalling channels.

After the connection establishment the base station monitors the properties of the radio channel and the signal quality on each connection. On account of the call set-up signalling, the base station, of course, knows the amount of traffic and the channel demand within its area. The base station configurator analyzes the measuring results and assigns the rake correlators dynamically to the connections in accordance with the measuring results and the amount of traffic.

The above-described analysis and assignment of rake correlators may be a continuous process in the base station. The variable parameter of the base station is the time interval of the assignment process, that is, the frequency at which the number of rake correlators is varied for the different connections. The time interval may vary from one millisecond to 24 hours. With the first-mentioned time interval, the assignment process is continuous, as described in the preceding paragraph; in a procedure utilizing the latter interval, the assignment is semi-fixed, and it does not so much depend on the current measuring results but more on daily averages of the qualities and traffic load of the connections.

The criterion for assigning the rake correlators to the different connections can be realized by several different methods. According to a preferred embodiment of the invention, one possible criterion is to use a signal-to-noise ratio measured by the base station for each connection as a function of different numbers of rake correlators. The base station assigns the correlators to the connections in such way that the minimum quality of the connections will be maximized. According to another preferred embodiment, the signal-to-noise ratio can be used as an assignment criterion such that if the ratio drops below a given value, the number of correlators assigned to the connection is increased; correspondingly, if the ratio is above a given threshold, the number of correlators is decreased. According to still another preferred embodiment of the invention, the bit error ratio can be used as an assignment criterion in such a way that if the ratio drops below a given value, the number of correlators assigned to the connection is increased; correspondingly, if the ratio is above the given threshold, the number of correlators is decreased.

In the example shown in FIG. 2, the outputs of the correlators 20a and 20b are connected via the switching matrix 21 to the inputs of the combiner 22. Correspondingly, the outputs of the correlators 20c, 20d and 20e are connected to the inputs of the combiner 23. The output of the correlator 20f is connected to the input of the combiner 24. The configurator receives measuring data about the signal quality from the combiners 22, 23 and 24. Assume that the assignment of the correlators takes place on the basis of the signal-to-noise ratio. Further assume that the configurator 25 detects on the basis of the received measuring values that an adequate signal quality is achieved by the combiner 23 by two correlators 20c and 20e. The configurator 25 thus commands the switching matrix to disconnect the output of the correlator 20d from the input of the combiner 23 and indicates the correlator that it should no longer follow the preceding signal. Assume correspondingly, that the configurator detects that the signal received by the combiner 24 is no longer of adequate quality with the correlator 20f. The configurator is now able to connect the output of the free correlator 20d to the input of the combiner 24 by the switching matrix, and to control the correlator 20d so that it will receive an appropriate signal.

The attached figures and the description related to them are only intended to illustrate the present invention. In its details the base station receiver according to the invention may vary within the scope of the attached claims.

We claim:

1. A rake-type CDMA base station receiver equipment, comprising:
   a number of correlators each having a received signal as its input,
   a number of diversity combiners for respective receiver branches,
   means for measuring the quality of the received signal,
   means for switching the correlators to the combiner of any one of the receiver branches, and means for controlling the switching means on the basis of data sent from the means for measuring the quality of the received signal or on the basis of the capacity loading of the base station receiver equipment.

2. The base station receiver equipment according to claim 1, wherein:
   the means for switching the correlators to the combiners are implemented by a switching matrix.

3. The base station receiver equipment according to claim 1, wherein:
   the means controlling the switching of the correlators to the desired combiners are located in a base station controller or in a base station having said receiver equipment.

4. The base station receiver equipment according to claim 1, wherein:
   a signal-to-noise ratio measured at a base station having said receiver equipment, for each connection, is used as a criterion for assigning the correlators to respective connections in such a way that if the signal-to-noise ratio drops below a given threshold over a connection, the number of correlators assigned to the respective connection is increased, provided that there are free correlators available, and correspondingly, if the signal-to-noise ratio of the respective connection is improved, the number of correlators assigned to the respective connection can be decreased.

5. The base station receiver equipment according to claim 1, wherein:
   a signal-to-noise ratio measured at a base station having said receiver equipment, for each connection, is used as a criterion for assigning the correlators to the respective connections in such a way that the base station measures the signal-to-noise ratio as a function of the number of said correlators and assigns the branches to the connections in such a way that the minimum quality of the connections will be maximized.

6. The base station receiver equipment according to claim 1, wherein:
   a bit error ratio measured at a base station having said receiver equipment, for each connection, is used as a criterion for assigning the correlators to respective connections in such a way that if the bit error ratio drops below a given threshold over a connection, the number of correlators assigned to the respective connection is increased, provided that there are free correlators available, and correspondingly, if the bit error ratio of the respective connection is improved, the number of correlators assigned to the respective connection can be decreased.

* * * * *